US011028288B2

(12) United States Patent
Suda et al.

(10) Patent No.: US 11,028,288 B2
(45) Date of Patent: Jun. 8, 2021

(54) LIQUID SUSPENSION OF CERIUM OXIDE PARTICLES

(71) Applicant: RHODIA OPERATIONS, Paris (FR)

(72) Inventors: Eisaku Suda, Tokushima (JP); Manabu Yuasa, Tokushima (JP); Takao Sekimoto, Tokushima (JP)

(73) Assignee: RHODIA OPERATIONS, Aubervilliers (FR)

( * ) Notice: Subject to any disclaimer, the term of this patent is extended or adjusted under 35 U.S.C. 154(b) by 105 days.

(21) Appl. No.: 16/424,031

(22) Filed: May 28, 2019

(65) Prior Publication Data

US 2020/0087539 A1   Mar. 19, 2020

Related U.S. Application Data

(63) Continuation of application No. 15/104,449, filed as application No. PCT/EP2014/077978 on Dec. 16, 2014, now Pat. No. 10,344,183.

(30) Foreign Application Priority Data

Dec. 16, 2013  (EP) .................................... 13306732

(51) Int. Cl.
| | |
|---|---|
| *C09G 1/02* | (2006.01) |
| *C09K 3/14* | (2006.01) |
| *C01F 17/206* | (2020.01) |
| *B82Y 30/00* | (2011.01) |
| *B82Y 40/00* | (2011.01) |

(52) U.S. Cl.
CPC .............. *C09G 1/02* (2013.01); *C01F 17/206* (2020.01); *C09K 3/1409* (2013.01);
(Continued)

(58) Field of Classification Search
CPC ....... C09G 1/02; C01F 17/206; C09K 3/1409; C09K 3/1436; C09K 3/1463;
(Continued)

(56) References Cited

U.S. PATENT DOCUMENTS

| | | | |
|---|---|---|---|
| 2006/0032836 A1‡ | 2/2006 | Feng .................... | B82Y 30/00 216/88 |
| 2010/0072417 A1* | 3/2010 | Criniere ............... | C09K 3/1436 252/79.1 |

(Continued)

FOREIGN PATENT DOCUMENTS

| | | | | |
|---|---|---|---|---|
| CN | 1424373 A | * | 6/2003 | |
| EP | 0939431 A1 | ‡ | 9/1999 | ............... C09G 1/02 |

(Continued)

*Primary Examiner* — Pegah Parvini
*Assistant Examiner* — Ross J Christie
(74) *Attorney, Agent, or Firm* — Osha Bergman Watanabe & Burton LLP

(57) ABSTRACT

The present invention relates to a suspension of cerium oxide particles in a liquid phase, in which said particles comprise secondary particles comprising primary particles, and a process for preparing said liquid suspension in which the cerium IV/total cerium molar ratio before precipitation is comprised between 1/10000 and 1/500000 and that the thermal treatment is being carried out under an inert atmosphere.

5 Claims, 1 Drawing Sheet

(52) U.S. Cl.
CPC .......... *C09K 3/1436* (2013.01); *C09K 3/1463* (2013.01); *C09K 3/1472* (2013.01); *B82Y 30/00* (2013.01); *B82Y 40/00* (2013.01); *C01P 2004/50* (2013.01); *C01P 2004/51* (2013.01); *C01P 2004/62* (2013.01); *C01P 2006/12* (2013.01); *C01P 2006/22* (2013.01)

(58) Field of Classification Search
CPC ...... C09K 3/1472; B82Y 30/00; B82Y 40/00; C01P 2004/50; C01P 2004/51; C01P 2004/62; C01P 2006/12; C01P 2006/22
See application file for complete search history.

(56) References Cited

U.S. PATENT DOCUMENTS

| | | | | |
|---|---|---|---|---|
| 2011/0225897 | A1* | 9/2011 | Criniere | C09G 1/04 51/309 |
| 2015/0030650 | A1‡ | 1/2015 | Criniere | B82Y 30/00 424/40 |
| 2018/0029012 | A1* | 2/2018 | Shen | B01J 37/08 |

FOREIGN PATENT DOCUMENTS

| | | | | |
|---|---|---|---|---|
| EP | 0939431 | A1 | 9/1999 | |
| EP | 1201607 | A1 ‡ | 5/2002 | .......... C01F 17/0043 |
| EP | 1201607 | A1 | 5/2002 | |
| EP | 1201725 | A1 ‡ | 5/2002 | ............... C09G 1/02 |
| EP | 1201725 | A1 | 5/2002 | |
| EP | 1234801 | A2 ‡ | 8/2002 | .......... C09K 3/1436 |
| EP | 1234801 | A2 | 8/2002 | |
| WO | WO-2005032705 | A1 * | 4/2005 | ............... C10L 10/06 |
| WO | 2008043703 | A2 | 4/2008 | |
| WO | WO-2008043703 | A2 ‡ | 4/2008 | ............... C09G 1/02 |
| WO | 2010020466 | A1 | 2/2010 | |
| WO | WO-2010020466 | A1 ‡ | 2/2010 | ............... A61K 8/19 |

\* cited by examiner
‡ imported from a related application

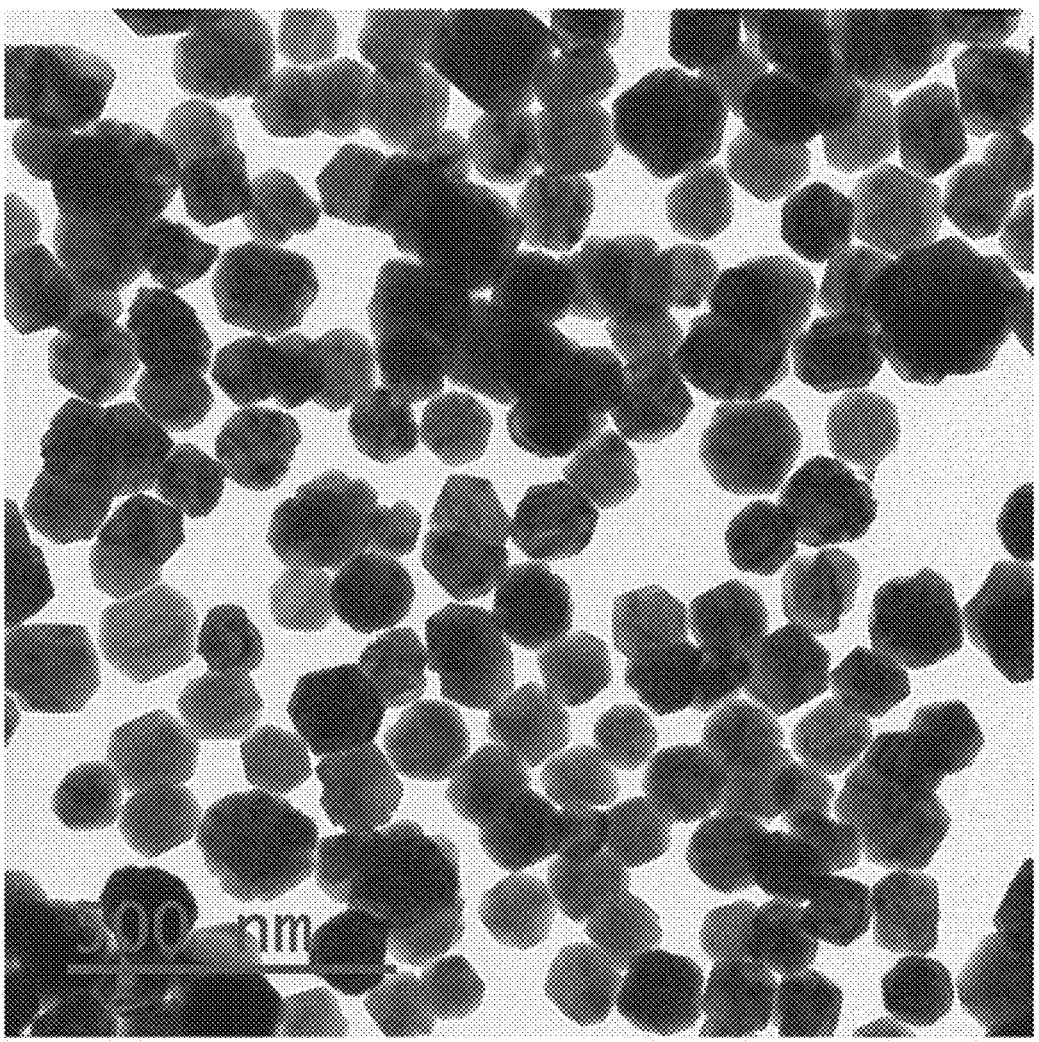

LIQUID SUSPENSION OF CERIUM OXIDE PARTICLES

This application is a continuation application of U.S. application Ser. No. 15/104,449, filed Jun. 14, 2016, which is a U.S. national stage entry under 35 U.S.C. § 371 of International Application No. PCT/EP2014/077978 filed Dec. 16, 2014, which claims priority to European application No. 13306732.2 filed on Dec. 16, 2013. The entire contents of these applications are explicitly incorporated herein by this reference.

The present invention relates to a suspension of cerium oxide particles in a liquid phase, in which said particles comprise secondary particles comprising primary particles, and a process for preparing said liquid suspension in which the cerium IV/total cerium molar ratio before precipitation is comprised between 1/10000 and 1/500000 and that the thermal treatment is being carried out under an inert atmosphere.

PRIOR ART

The following discussion of the prior art is provided to place the invention in an appropriate technical context and enable the advantages of it to be more fully understood. It should be appreciated, however, that any discussion of the prior art throughout the specification should not be considered as an express or implied admission that such prior art is widely known or forms part of common general knowledge in the field.

Chemical-mechanical polishing (CMP) slurries are used, for example, to planarize surfaces during the fabrication of semiconductor chips and related electronic components. CMP slurries typically include reactive chemical agents and abrasive particles dispersed in a liquid carrier. The abrasive particles perform a grinding function when pressed against the surface being polished using a polishing pad, and separately, the reactive chemical agents serve to oxidize the surface.

The development of the electronics industry requires the increasingly considerable use of compositions for polishing various parts such as discs or dielectric compounds. These compositions are in the form of suspensions and they must correspond to a certain number of characteristics. For example, they must offer a high degree of removal of material, which reflects their abrasive capacity. They must also have a defectuosity which is as low as possible; the term "defectuosity" is intended to mean in particular the amount of scratches exhibited by the substrate once treated with the composition.

It is generally believed that for reasons of stability and of ease of use, these suspensions must consist of particles of submicronic dimension, i.e. generally less than 300 nm and that the presence of particles that are too fine in these suspensions reduces their abrasive capacities. Moreover, particles that are too large can contribute to an increase in the defectuosity as taught by WO2008/043703 publication. There is therefore a need for suspensions in which the particles are monodisperse. It should also be noted that, in order to obtain optimal performance levels, this monodispersity should apply both to the primary particles and to the secondary particles, i.e. the aggregates consisting of the primary particles.

It is thus understood that the development of these suspensions is a complex problem.

Invention

This application is a continuation application of U.S. application Ser. No. 15/104,449, filed Jun. 14, 2016, which is a U.S. national stage entry under 35 U.S.C. § 371 of International Application No. PCT/EP2014/077978 filed Dec. 16, 2014, which claims priority to European application No. 13306732.2 filed on Dec. 16, 2013. The entire contents of these applications are explicitly incorporated herein by this reference.

Should the disclosure of any patents, patent applications, and publications which are incorporated herein by reference conflict with the description of the present application to the extent that it may render a term unclear, the present description shall take precedence.

The object of the invention is to provide suspensions of cerium oxide particles providing a sufficient high removal rate and as well as a good planarization in the polishing application while avoiding an increase in the defectuosity in order to reduce the amount of scratches exhibited by the substrate once treated with the composition.

It appears indeed, contrarily to the knowledge of the prior art, that a suspension providing secondary and primary particles of generally considered high sizes will not lead to attended drawbacks in the polishing application, notably with the proviso to follow specific parameters relative to sizes and standard deviations of said sizes.

The present invention concerns then a suspension of cerium oxide particles in a liquid phase, in which said particles comprise secondary particles comprising primary particles, wherein:

said secondary particles have an average size D50 comprised between 105 and 1000 nm, with a standard deviation comprised between 10 and 50% of the value of said average size of said secondary particles; and said primary particles have an average size D50 comprised between 100 and 300 nm, with a standard deviation comprised between 10 and 30% of the value of said average size of said primary particles.

The present invention also concerns a process for preparing a cerium oxide suspension, notably as previously defined, comprising at least the following steps:

(a) treating a solution comprising at least a cerium III salt, a cerium IV salt and a base, under an inert atmosphere, whereby a precipitate is obtained; the cerium IV/total cerium molar ratio before precipitation is comprised between 1/10000 and 1/500000;

(b) subjecting the medium obtained in the preceding step to a thermal treatment under an inert atmosphere, at least one of the steps (a) or (b) being carried out in the presence of nitrate ions; and (c) acidifying and washing the medium thus obtained, whereby the suspension is obtained.

Other characteristics, details and advantages of the invention will emerge even more fully upon reading the description which follows, the various concrete but non-limiting examples intended to illustrate it.

BRIEF DESCRIPTION OF THE DRAWINGS

FIG. 1 is a TEM micrograph of an exemplary embodiment of the suspensions of cerium oxide particles disclosed herein.

DEFINITIONS

Throughout the description, including the claims, the term "comprising one" should be understood as being synonymous with the term "comprising at least one", unless otherwise specified, and "between" should be understood as being inclusive of the limits.

For the remainder of the description, the expression "suspension of cerium oxide particles" denotes a system consisting of solid fine particles of submicronic dimension based on this oxide, stably dispersed in a liquid phase, it being possible for said particles to also optionally contain residual amounts of bound or adsorbed ions such as, for example, nitrates or ammoniums.

Still for the remainder of the description, the term "specific surface area" is intended to mean the B. E. T. specific surface area determined by nitrogen adsorption in accordance with standard ASTM D 3663-78 established based on the Brunauer-Emmett-Teller method described in the periodical "The Journal of the American Chemical Society, 60, 309 (1938)".

The particles of the suspension are based on cerium oxide which is generally crystalline ceric oxide.

Secondary particles are aggregates aggregated from other, finer particles, subsequently called primary particles.

The average value of the size of the primary particles is determined by TEM micrograph, considering that crystal structure may be confirmed by XRD.

The standard deviation mentioned in the present invention has the usual mathematical meaning, it is the square root of the variance and it is notably expressed in WO2008/043703 publication.

For the entire description regarding the secondary particles, the average size and the dispersion index are the values obtained by implementing the laser diffraction technique using a laser particle sizer (distribution by volume).

The term "dispersion index" is defined in WO2008/043703 publication. The term "dispersion index" is intended to mean the ratio:

$$\sigma/m = (d90 - d10)2d50$$

in which:
d90 is the particle size or diameter for which 90% of the particles have a diameter of less than d90;
d10 is the particle size or diameter for which 10% of the particles have a diameter of less than d10;
d50 is the average size or diameter of the particles.

Details of the Invention

Object of the present invention then comprises a suspension of cerium oxide particles in a liquid phase, in which said particles comprise at least secondary particles comprising at least primary particles. Suspension of the present invention may comprise secondary particles and primary particles.

Notably without a specific deagglomeration step, secondary particles may have an average size D50 comprised between 105 and 1000 nm, preferably between 110 and 800 nm, more preferably between 110 and 700 nm.

Several deagglomeration of particles may be carried out, such as for example double impact jet treatment or ultrasonic deagglomeration. In this case second particles having an average size D50 preferably comprised between 105 and 300 nm, more preferably between 110 and 250 nm, again more preferably between 110 and 200 nm.

More details may be given for instance regarding the double impact jet treatment without limiting the content of the present invention. The secondary particle size may be controlled by the pressure of slurry in the treatment machine in case of the double impact jet treatment, as the velocity of slurry from the nozzle in the machine is usually decided by the pressure. The secondary particle size depends on the pressure of slurry and the pass number wherein the deagglomeration by double impact jet treatment is repeated at the same pressure.

Secondary particles have an average size D50 with a standard deviation comprised between 10 and 50% of the value of said average size of said secondary particles, preferably between 15 and 45%.

Moreover, according to another advantageous characteristic of the invention, these secondary particles are themselves also monodisperse. They may have a dispersion index of at most 0.6. This index can be in particular of at most 0.5, more particularly at most 0.4. Preferably, the dispersion index of secondary particles is comprised between 0.22 and 0.6, more preferably between 0.26 and 0.6, particularly between 0.26 and 0.4.

D90/D50 ratio of secondary particles of the suspension of the invention may be comprised between 1.2 and 2.5.

Primary particles have an average size D50 comprised between 100 and 300 nm, preferably between 100 and 250 nm.

Primary particles have an average size D50 with a standard deviation comprised between 10 and 20% of the value of said average size of said secondary particles.

The primary particles of the suspension preferably provide a specific surface area (B. E. T.) comprised between 3 and 15 $m^2/g$, more preferably comprised between 4 and 12 $m^2/g$, particularly between 3 and 10 $m^2/g$.

The liquid phase of the suspensions according to the invention may be of various nature, such as water, water/water-miscible solvent mixture, or an organic solvent. The liquid phase of the suspensions may also be an organic solvent mixture.

As an example of a solvent that may be used for a water/water-miscible solvent mixture, mention may be made of alcohols such as methanol or ethanol, glycols such as ethylene glycol, acetate derivatives of glycols, such as ethylene glycol monoacetate, or polyols.

As an example of an organic solvent, mention may be made of aliphatic hydrocarbons such as hexane, heptane, octane or nonane, inert cycloaliphatic hydrocarbons such as cyclohexane, cyclopentane or cycloheptane, aromatic hydrocarbons such as benzene, toluene, ethylbenzene, xylenes, or liquid naphthenes. Also suitable are petroleum fractions of the Isopar or Solvesso type (trade marks registered by the company Exxon), in particular Solvesso 100 which contains essentially a mixture of methylethylbenzene and trimethylbenzene, Solvesso 150 which contains a mixture of alkylbenzenes, in particular of dimethylbenzene and of tetramethylbenzene, and Isopar which contains essentially C11 and C12 isoparaffinic and cycloparaffinic hydrocarbons. Other types of petroleum fractions that may also be mentioned include those of Petrolink® type from the company Petrolink or of Isane® type from the company Total.

Chlorinated hydrocarbons, such as chlorobenzene, dichlorobenzene or chlorotoluene, can also be used as organic solvent. Aliphatic and cycloaliphatic ethers or ketones, for instance diisopropyl ether, dibutyl ether, methyl ethyl ketone, methyl isobutyl ketone, diisobutyl ketone or mesityl oxide, can be envisaged.

Esters can be used, such as those derived from the reaction of acids with C1 to C8 alcohols, and in particular palmitates of secondary alcohols such as isopropanol. By way of example, mention may be made of butyl acetate.

Of course, the liquid phase can be based on a mixture of two or more hydrocarbons or compounds of the type described above.

The suspensions of the invention have an overall oxide content, i.e. cerium oxide content, which can vary within wide limits and which can, for example, be comprised between 1 and 40%, in particular between 5 and 30% by mass of oxide.

Similarly, the pH of these suspensions can be within a broad range. Thus, the pH of the suspensions derived from the preparation processes that will be described below is generally between 2 and 6, more particularly between 2 and 5, the suspensions remaining stable within the meaning given here below, within this pH range. However the stability can be improved either within these ranges of pH either beyond the value of 5 or 6 in a known manner, by addition to the suspension of compounds such as anionic or zwitterionic polymers or molecules. As compounds of this kind one can mention those compounds obtained by polymerizing at least one monomer chosen among the following: an ethylenically unsaturated, linear or branched, aliphatic, cyclic or aromatic monocarboxylic or polycarboxylic acid or anhydride. Polyacrylic acid or citric acid may be mentioned as examples.

Finally, it will be noted that the suspensions of the invention are stable. This is intended to mean that no formation of a settling cake is observed on these suspensions before several days, for example at least 8 days. Furthermore, the settling cake, if it forms, can be resuspended by simple agitation.

Suspensions of the present invention may be obtained according to several processes.

Advantageously, the suspension of the invention can be prepared according to a process as defined in which one of the important parameter is precipitation of cerium III salt and cerium IV salt; the cerium IV/total cerium molar ratio before precipitation being comprised between 1/10000 and 1/500000. The cerium IV/total cerium molar ratio before precipitation may preferably be comprised between 1/50000 and 1/300000.

The first step (a) of the process above therefore consists in treating a solution comprising at least a cerium III salt, a cerium IV salt and a base, under an inert atmosphere, whereby a precipitate is obtained; the cerium IV/total cerium molar ratio before precipitation is comprised between 1/10000 and 1/500000.

As cerium III salts, use may more particularly be made of cerium III nitrate, chloride, sulfate or carbonate, and also mixtures of these salts, such as mixed nitrates/chlorides.

Cerium IV salt may be for example cerium IV nitrate, cerium ammonium nitrate, cerium ammonium sulfate, and cerium IV sulfate.

It is notably possible in said step a) to provide a starting solution of a cerium III salt, optionally comprising a cerium IV salt. This solution may be then treated with a solution comprising a base and optionally a cerium IV salt, under an inert atmosphere, whereby a precipitate is obtained. It is also possible to directly mix cerium III salt, cerium IV salt and a base. It is notably possible to provide a starting solution of a cerium III salt and treat this solution with a solution comprising a base and a cerium IV salt, under an inert atmosphere, whereby a precipitate is obtained.

In the known manner, this starting solution of a cerium III salt, optionally comprising a cerium IV salt, should have the acidity suitable for the cerium to be entirely present in solution.

The starting solution can be degassed beforehand by bubbling with an inert gas. The term "inert gas" or "inert atmosphere" is intended to mean, for the present description, an atmosphere or a gas free of oxygen, it being possible for the gas to be, for example, nitrogen or argon.

Products of the hydroxide type can in particular be used as base. Mention may be made of alkali metal or alkaline-earth metal hydroxides and aqueous ammonia. Secondary, tertiary or quaternary amines can also be used. However, the amines and the aqueous ammonia may be preferred since they reduce the risks of pollution by alkali metal cations or alkaline-earth metal cations.

The base can also be degassed beforehand by bubbling with an inert gas.

The amount of ammonia, expressed by the $NH_3/Ce$ molar ratio, is preferably comprised between 8 and 30.

To perform the reaction, the bringing into contact can be carried out in any order of introducing the reactants. However, it is preferable to introduce the starting solution into a medium containing the base.

This step should be carried out under an inert atmosphere, either in a closed reactor or in a semi-closed reactor with sweeping with the inert gas. The bringing into contact is generally carried out in a stirred reactor.

Finally, this step is generally carried out at a temperature comprised between 20° C. and 25° C., or a temperature of at most 50° C.

It is notably possible to first prepare a cerium nitrate solution comprising a cerium III salts and then prepare a base solution comprising a cerium IV salt.

This second solution may be then degassed by bubbling with an inert gas.

Cerium nitrate solution may be then mixed with the base solution comprising comprising a cerium IV salt.

The second step (b) of the process is a thermal treatment of the reaction medium obtained at the end of the preceding step.

This treatment consists in heating the medium and in maintaining it at a temperature which is generally at most 95° C., and more particularly between 60° C. and 95° C.

The duration of this treatment can be between a few hours and several tens of hours.

This treatment is also carried out under an inert atmosphere, the description with respect to this atmosphere for the second step being applied similarly here. Similarly the treatment is carried out in a stirred reactor.

According to one characteristic of the process of the invention, at least one of steps (a) and (b) should be carried out in the presence of nitrate ions. In general, the nitrate ions are provided by the addition of nitric acid, more particularly in step (a), during the preparation of the cerium III solution.

The amount of nitrate ions, expressed by the $NO_3^-/Ce_3^+$ molar ratio, is generally comprised between 1/6 and 5/1.

The last step of the process, step (c), in fact comprises two successive operations which can be carried out in any order. These operations are, firstly, an acidification and, secondly, a wash.

These operations will be described more specifically below, for the case of a series in which acidification is followed by washing.

The acidification is generally carried out, after cooling of the medium obtained at the end of step (b), by the addition of an acid.

Any inorganic or organic acid can be used. Nitric acid is more particularly used.

The amount of acid added is such that the pH of the medium after acidification is between 1 and 5.

This operation can be carried out under air; it is no longer necessary to perform the procedure under an inert atmosphere at this stage of the process.

The acidification is followed by washing, the aim of which is to remove from the suspension the soluble species, essentially salts.

The washing can be carried out in various ways with or without solid/liquid separation.

It can thus be carried out by separating the solid particles from the liquid phase, for example by frontal filtration, settling out or centrifugation. The solid obtained is then re-suspended in an aqueous phase. The process can also be carried out by tangential filtration.

This washing can be optionally repeated if necessary, for example until a given conductivity of the suspension is obtained, whereby the conductivity measures the amount of impurities present in this suspension.

As indicated above, the order of the operations can be reversed compared with that which has just been described. Thus, at the end of step (b), and, here again, generally after cooling of the medium obtained, washing can then carried out in the manner described above. At the end of the washing, the acidification of the medium obtained is then carried out.

At the end of the steps which have been described, it is possible to treat the suspension which has been obtained in a known deagglomeration apparatus such as an apparatus of ultrasonic treatment, of double impact jet treatment or a wet milling apparatus.

A suspension according to the invention is obtained at the end of step (c).

In the case of a suspension partially or completely in an organic solvent medium other than water, this suspension can be prepared, in a manner known per se, from an aqueous suspension as obtained by means of the process which has just been described and by bringing into contact with the organic solvent.

At this stage, it may be advantageous to add to the organic phase a promoter agent whose function is to accelerate the transfer of the particles from the aqueous phase to the organic phase and to improve the stability of the organic suspensions obtained.

As a promoter agent, use may be made of compounds comprising an alcohol function, and most particularly linear or branched aliphatic alcohols having from 6 to 12 carbon atoms. As specific examples, mention may be made of 2-ethylhexanol, decanol, dodecanol, or mixtures thereof.

The bringing into contact can be carried out at ambient temperature, for example approximately 20° C., but also at a higher temperature, for example in a range of from 60° C. to 150° C.

The separation between the aqueous and organic phases is carried out, for example, by distillation, by settling out or by centrifugation depending on the nature of the organic solvent.

The invention also relates to a redispersible powder of cerium oxide particles. It is a characteristic of this powder that, after introduction into a liquid phase and redispersion in a liquid phase, it produces a suspension according to the invention as described above. The redispersion is carried out by simple agitation of the powder in the liquid phase.

This powder can be obtained from a suspension according to the invention by drying and then calcination at a temperature which may be, for example, at most 300° C., and in particular between 100° C. and 200° C., over a period which can range between a few minutes and a few hours.

The invention also relates to a suspension for polishing, comprising either a suspension as described above, or a suspension as obtained by means of the processes described above, or else a suspension obtained after re-dispersion of a powder according to the invention. This suspension can be used for polishing glass, for example in the crystal-making or mirror industry, flat glass, television screens or spectacles, or else for polishing ceramics or other materials of vitreous type. This suspension can also be used most particularly for CMP-type polishing in the electronics industry and therefore for polishing metal substrates which go to make up microprocessors, but also for polishing insulating layers of these same microprocessors, the suspension of the invention being particularly suitable for the polishing of said layers. These layers are generally made of silica (doped silica, porous silica).

In general, such suspensions comprise, in addition to the compound with abrasive property, such as the cerium oxide particles, additives such as a dispersing agent or an oxidant.

The present invention also concerns a method of removing a portion of a substrate, notably in a CMP operation, comprising at least the following steps:

Providing at least a suspension of the invention,
Contacting at least the suspension and the substrate to be polished, and
Performing the polishing on the substrate.

As other applications of the suspensions of the invention, mention may be made of catalysis, in particular for automobile post-combustion; in this case, the suspensions are used in the preparation of catalysts. The suspensions can also be used for their anti-UV properties, for example in the preparation of films of polymers (of the acrylic or polycarbonate type, for example), of paints, of papers or of cosmetic compositions, in particular in the preparation of anti-UV creams.

The following examples are included to illustrate embodiments of the invention. Needless to say, the invention is not limited to described examples.

EXPERIMENTAL PART

Comparative Example 1

A dilute cerium nitrate solution was prepared by adding 13.8 kg of a 3M trivalent cerium nitrate solution, 2.2 kg of 68% $HNO_3$ solution, 0.4 kg of deionized water and cerium nitrate (IV) equivalent with 1/1250 of cerium IV/total cerium molar ratio. This solution was loaded into a semi-closed 20 l vessel and then degassed with agitation and with nitrogen bubbling.

A dilute aqueous ammonia solution is prepared by adding 80 kg of deionized water and a solution of 9.3 kg of 25% aqueous ammonia. This solution is loaded into a semi-closed 100 l jacketed reactor and then subjected to agitation and nitrogen bubbling.

The diluted cerium nitrate solution is then added, at ambient temperature, to the dilute aqueous ammonia solution, with the same agitation and under nitrogen sweeping. The temperature of the reaction mixture is then increased to 80° C. and then maintained at this temperature. At the end of this heat treatment, the reaction mixture is left to cool and was acidified to pH 2 by adding 68% $HNO_3$.

The reaction mixture was cooled and acidified at pH 2 with 68% $HNO_3$. The reaction mixture was filtrated and washed with deionized water. The washing was repeated when the conductivity of washing solution was less 0.04 mS/cm. The suspension obtained finally was adjusted at 30% of $CeO_2$.

The BET specific surface area determined by nitrogen adsorption was 13 m$^2$/g.

The suspension was observed by TEM. The primary particles were monodispersed and the size was about 94 nm. For approximately 150 particles representative of the suspension, each of particles were counted and measured. The average particle size was 94 nm and standard deviation was 21 nm corresponding to 22% of average particle size.

The secondary particle size was measured at relative refractive index 1.7 of $CeO_2$ in the water by laser particle sizer (Horiba LA-910). The median size D50 was 96 nm and standard deviation was 36 nm corresponding to 26% of average particle size. The D10, D50 and D90 were 82, 96 and 122 nm, respectively. The calculated dispersion a/m and D90/D50 were 0.21 and 1.27 respectively.

Example 1

A cerium nitrate solution was prepared by mixing 13.8 kg of 3M trivalent cerium nitrate, 2.2 kg of 68% $HNO_3$ and 0.4 kg of deionized water. This solution was put into 20 L semi-closed vessel.

The ammonia aqueous solution was prepared by adding 15.5 kg of 25% ammonia water and 73 kg of deionized water. Subsequently cerium nitrate (IV) equivalent with 1/80000 of cerium IV/total cerium molar ratio was added. This solution was put into 100 L semi-closed reactor jacketed, and bubbled by $N_2$ gas with the agitation for 1 hour.

The above described cerium nitrate solution was mixed with the ammonia aqueous solution in approximately 30 min in the same conditions of agitation and $N_2$ bubbling.

The temperature of reaction mixture was heated up to 80° C. in approximately 1 hours and maintained for approximately 10 hours at the same conditions of agitation without $N_2$ bubbling.

The reaction mixture was cooled and acidified at pH 2 with 68% $HNO_3$. The reaction mixture was filtrated and washed with deionized water. The washing was repeated when the conductivity of washing solution was less 0.04 mS/cm. The suspension obtained finally was deagglomerated and adjusted at 30% of $CeO_2$.

The BET specific surface area determined by nitrogen adsorption was 10 $m^2/g$.

The suspension was observed by TEM. The primary particles were monodispersed and the size was about 110 nm. For approximately 150 particles representative of the suspension, each of particles were counted and measured. The average particle size was 110 nm and standard deviation was 25 nm corresponding to 22% of average particle size. TEM picture is reported in FIG. 1.

The secondary particle size was measured at relative refractive index 1.7 of $CeO_2$ in the water by laser particle sizer (Horiba LA-910). The median size D50 was 113 nm and standard deviation was 17 nm corresponding to 15% of average particle size. The D10, D50 and D90 were 96, 113 and 139 nm, respectively. The calculated dispersion a/m and D90/D50 were 0.19 and 1.23 respectively.

Example 2

A cerium nitrate solution was prepared by mixing 13.8 kg of 3M trivalent cerium nitrate, 1.3 kg of 68% $HNO_3$ and 1.0 kg of deionized water. This solution was put into 20 L semi-closed vessel.

The ammonia aqueous solution was prepared by adding 15.5 kg of 25% ammonia water and 73 kg of deionized water. Subsequently cerium nitrate (IV) equivalent with 1/80000 of cerium IV/total cerium molar ratio was added. This solution was put into 100 L semi-closed reactor jacketed, and bubbled by $N_2$ gas with the agitation for 1 hour.

The above described cerium nitrate solution was mixed with the ammonia aqueous solution in approximately 30 min in the same conditions of agitation and $N_2$ bubbling.

The temperature of reaction mixture was heated up to 80° C. in approximately 1 hours and maintained for approximately 10 hours at the same conditions of agitation without $N_2$ bubbling.

The reaction mixture was cooled and acidified at pH 2 with 68% $HNO_3$. The reaction mixture was filtrated and washed with deionized water. The washing was repeated when the conductivity of washing solution was less 0.04 mS/cm. The suspension obtained finally was deagglomerated and adjusted at 30% of $CeO_2$.

The BET specific surface area determined by nitrogen adsorption was 10 $m^2/g$.

The suspension was observed by TEM. The primary particles were monodispersed and the size was about 128 nm. For approximately 150 particles representative of the suspension, each of particles were counted and measured. The average particle size was 128 nm and standard deviation was 17 nm corresponding to 13% of average particle size.

The secondary particle size was measured at relative refractive index 1.7 of $CeO_2$ in the water by laser particle sizer (Horiba LA-910). The median size D50 was 128 nm and standard deviation was 29 nm corresponding to 23% of average particle size. The D10, D50 and D90 were 103, 128 and 170 nm, respectively. The calculated dispersion a/m and D90/D50 were 0.26 and 1.33 respectively.

Example 3

A cerium nitrate solution was prepared by mixing 13.5 kg of 3M trivalent cerium nitrate, 2.2 kg of 68% $HNO_3$ and 0.7 kg of deionized water. This solution was put into 20 L semi-closed vessel. The ammonia aqueous solution was prepared by adding 15.5 kg of 25% ammonia water and 79 kg of deionized water. Subsequently cerium nitrate (IV) equivalent with 1/80000 of cerium IV/total cerium molar ratio was added. This solution was put into 100 L semi-closed reactor jacketed, and bubbled by $N_2$ gas with the agitation for 1 hour.

The above described cerium nitrate solution was mixed with the ammonia aqueous solution in approximately 30 min in the same conditions of agitation and $N_2$ bubbling. The temperature of reaction mixture was heated up to 85° C. in approximately 1 hour and maintained for approximately 10 hours at the same conditions of agitation without $N_2$ bubbling. The reaction mixture was cooled and acidified at pH 2 with 68% $HNO_3$. The reaction mixture was filtrated and washed with deionized water. The washing was repeated when the conductivity of washing solution was less 0.04 mS/cm. The suspension obtained finally was deagglomerated and adjusted at 30% of $CeO_2$.

The BET specific surface area determined by nitrogen adsorption was 9 $m^2/g$.

The suspension was observed by TEM. The primary particles were monodispersed and the size was about 129 nm. For approximately 150 particles representative of the suspension, each of particles were counted and measured. The average particle size was 129 nm and standard deviation was 24 nm corresponding to 19% of average particle size.

The secondary particle size was measured at relative refractive index 1.7 of $CeO_2$ in the water by laser particle sizer (Horiba LA-910). The median size D50 was 130 nm and standard deviation was 32 nm corresponding to 25% of average particle size. The D10, D50 and D90 were 104, 130 and 178 nm, respectively. The calculated dispersion a/m and D90/D50 were 0.28 and 1.37 respectively.

Example 4

A cerium nitrate solution was prepared by mixing 13.8 kg of 3M trivalent cerium nitrate, 2.2 kg of 68% $HNO_3$ and 0.4 kg of deionized water. This solution was put into 20 L semi-closed vessel.

The ammonia aqueous solution was prepared by adding 15.5 kg of 25% ammonia water and 73 kg of deionized water. Subsequently cerium nitrate (IV) equivalent with 1/140000 of cerium IV/total cerium molar ratio was added. This solution was put into 100 L semi-closed reactor jacketed, and bubbled by $N_2$ gas with the agitation for 1 hour.

The above described cerium nitrate solution was mixed with the ammonia aqueous solution in approximately 30 min in the same conditions of agitation and $N_2$ bubbling.

The temperature of reaction mixture was heated up to 80° C. in approximately 1 hours and maintained for approximately 15 hours at the same conditions of agitation without $N_2$ bubbling.

The reaction mixture was cooled and acidified at pH 2 with 68% $HNO_3$. The reaction mixture was filtrated and washed with deionized water. The washing was repeated when the conductivity of washing solution was less 0.04 mS/cm. The suspension obtained finally was deagglomerated and adjusted at 30% of $CeO_2$.

The BET specific surface area determined by nitrogen adsorption was 9 $m^2/g$.

The suspension was observed by TEM. The primary particles were monodispersed and the size was about 131 nm. For approximately 150 particles representative of the suspension, each of particles were counted and measured. The average particle size was 131 nm and standard deviation was 14 nm corresponding to 11% of average particle size.

The secondary particle size was measured at relative refractive index 1.7 of $CeO_2$ in the water by laser particle sizer (Horiba LA-910). The median size D50 was 129 nm and standard deviation was 32 nm corresponding to 25% of average particle size. The D10, D50 and D90 were 102, 129 and 177 nm, respectively. The calculated dispersion a/m and D90/D50 were 0.29 and 1.37 respectively.

Example 5

A cerium nitrate solution was prepared by mixing 13.5 kg of 3M trivalent cerium nitrate, 2.2 kg of 68% $HNO_3$ and 0.7 kg of deionized water. This solution was put into 20 L semi-closed vessel.

The ammonia aqueous solution was prepared by adding 15.5 kg of 25% ammonia water and 73 kg of deionized water. Subsequently cerium nitrate (IV) equivalent with 1/80000 of cerium IV/total cerium molar ratio was added. This solution was put into 100 L semi-closed reactor jacketed, and bubbled by $N_2$ gas with the agitation for 1 hour.

The above described cerium nitrate solution was mixed with the ammonia aqueous solution in approximately 30 min in the same conditions of agitation and $N_2$ bubbling.

The temperature of reaction mixture was heated up to 85° C. in approximately 1 hour and maintained for approximately 20 hours at the same conditions of agitation without $N_2$ bubbling.

The reaction mixture was cooled and acidified at pH 2 with 68% $HNO_3$. The reaction mixture was filtrated and washed with deionized water. The washing was repeated when the conductivity of washing solution was less 0.04 mS/cm. The suspension obtained finally was deagglomerated and adjusted at 30% of $CeO_2$.

The BET specific surface area determined by nitrogen adsorption was 8 $m^2/g$.

The suspension was observed by TEM. The primary particles were monodispersed and the size was about 165 nm. For approximately 150 particles representative of the suspension, each of particles were counted and measured. The average particle size was 165 nm and standard deviation was 25 nm corresponding to 15% of average particle size.

The secondary particle size was measured at relative refractive index 1.7 of $CeO_2$ in the water by laser particle sizer (Horiba LA-910). The median size D50 was 137 nm and standard deviation was 36 nm corresponding to 26% of average particle size. The D10, D50 and D90 were 106, 137 and 192 nm, respectively. The calculated dispersion a/m and D90/D50 were 0.31 and 1.40 respectively.

The properties of secondary particle after deagglomeration for the suspensions of Examples 1 to 5 and Comparative Example 1 are reported in Table 1.

TABLE 1

| Samples | SSA ($m^2/g$) | D10 (nm) | D50 (nm) | D90 (nm) | D90/D50 | σ/m |
|---|---|---|---|---|---|---|
| Comparative 1 | 13 | 82 | 96 | 122 | 1.27 | 0.21 |
| 1 | 10 | 96 | 113 | 139 | 1.23 | 0.19 |
| 2 | 10 | 103 | 128 | 170 | 1.33 | 0.26 |
| 3 | 9 | 104 | 130 | 178 | 1.37 | 0.28 |
| 4 | 9 | 102 | 129 | 177 | 1.37 | 0.29 |
| 5 | 8 | 106 | 137 | 192 | 1.40 | 0.31 |

σ/m = (D90 − D10)/(2 * D50)

Example 6: Polishing Application

The suspensions of Examples 1 to 5 and Comparative Example 1 were tested in a polishing application with the following polishing conditions:
Polishing tool: LM15
Pad: SFMA-soft polyurethane pad
Wafer: Quartz glass with a coefficient for RR calc=45.564
Slurry concentration: 1 wt %
Load: 10 kg
Pad speed: 80 rpm/Drivers speed: 40 rpm/Agitation speed: 400 rpm
Pump flow: 500 mL/min
Polishing duration: 30 mins (one shot)
Polishing performances are reported in Table 2.

TABLE 2

| Samples | Removal rate (μm/min) |
|---|---|
| Comparative 1 | 0.037 |
| 1 | 0.066 |
| 2 | 0.090 |
| 3 | 0.102 |
| 4 | 0.082 |
| 5 | 0.137 |

Removal rate was measured as follows: before polishing, the weight of a $SiO_2$ quartz substrate was measured by a balance. After polishing, the $SiO_2$ quartz substrate was washed and dried. The weight of $SiO_2$ quartz substrate after polishing was measured. The removal rate was calculated by "weight loss before and after polishing", "polishing duration" and "the density and the area of $SiO_2$ quartz substrate". The following formula was used for calculation.

$$RR = \frac{(m_{before} - m_{after}) * 10^3}{A_{surf} * \rho_{quartz} * t_{exp}}$$

$t_{exp} = 30$ min, $\rho_{quartz} = 2.2$ g/cm$^3$, $A_{surf} = 100$ cm$^2$

RR: removal rate (μm/min)
m: weight of $SiO_2$ quartz substrate (g)
A: surface area of $SiO_2$ quartz substrate (cm$^2$)
ρ: density of $SiO_2$ quartz (g/cm$^3$)
t: duration time (min)

The suspension of cerium oxide particles in a liquid phase according to the present invention (Examples 1-5) permits to reach higher removal rates in the polishing application in comparison with suspensions of the prior art (Comp. Example 1), without observing scratches on the treated substrate.

The invention claimed is:

1. A process for preparing a cerium oxide suspension, the process comprising:
   (a) treating a solution comprising at least a cerium III salt, a cerium IV salt and a base, under an inert atmosphere, to form a precipitate in solution; wherein the cerium IV/total cerium molar ratio before precipitation is between 1/10000 and 1/500000;
   (b) thermally treating the precipitate in solution under an inert atmosphere to form a thermally treated medium, wherein at least one of steps (a) or (b) is carried out in the presence of nitrate ions; and
   (c) acidifying and washing the thermally treated medium, whereby the suspension is obtained.

2. The process according to claim 1, wherein the cerium IV/total cerium molar ratio before precipitation is between 1/50000 and 1/300000.

3. The process according to claim 1, wherein the cerium IV is at least one compound selected from the group consisting of: cerium IV nitrate, cerium ammonium nitrate, cerium ammonium sulfate, and cerium IV sulfate.

4. The process according to claim 1, wherein the amount of nitrate ions, expressed by the $NO_3^-/Ce_3^+$ molar ratio, is between 1/6 and 5/1.

5. The process according to claim 1, wherein step a) comprises treating a solution of a cerium III salt with a solution comprising a base and a cerium IV salt, under an inert atmosphere, to form a precipitate in solution.

* * * * *